US012382922B2

United States Patent
Cohn

(10) Patent No.: US 12,382,922 B2
(45) Date of Patent: Aug. 12, 2025

(54) SELF-INFLATING ANIMAL HARNESS SYSTEM

(71) Applicant: Thomas Andrew Cohn, Bedford Corners, NY (US)

(72) Inventor: Thomas Andrew Cohn, Bedford Corners, NY (US)

(73) Assignee: Thomas Andrew Cohn, Bedford Corners, NY (US)

( * ) Notice: Subject to any disclaimer, the term of this patent is extended or adjusted under 35 U.S.C. 154(b) by 78 days.

(21) Appl. No.: 18/133,021

(22) Filed: Apr. 11, 2023

(65) Prior Publication Data

US 2023/0320316 A1 Oct. 12, 2023

Related U.S. Application Data

(60) Provisional application No. 63/330,013, filed on Apr. 12, 2022.

(51) Int. Cl.
*A01K 1/02* (2006.01)
*A01K 13/00* (2006.01)
(Continued)

(52) U.S. Cl.
CPC .......... *A01K 1/0263* (2013.01); *A01K 1/0272* (2013.01); *A01K 13/006* (2013.01); *B60R 21/0132* (2013.01); *B60R 21/0136* (2013.01); *B60R 21/0155* (2014.10); *B60R 21/18* (2013.01); *G08B 25/00* (2013.01); *B60R 2021/01102* (2013.01)

(58) Field of Classification Search
CPC .. A01K 1/0263; A01K 1/0272; A01K 13/006; B60R 21/0155; B60R 21/0132; B60R 21/0136; B60R 21/18; B60R 2021/01102; G08B 25/00
See application file for complete search history.

(56) References Cited

U.S. PATENT DOCUMENTS

| 2006/0076761 A1* | 4/2006 | Brown | B60R 21/01516 280/801.1 |
| 2013/0009391 A1* | 1/2013 | Miller | B60R 21/18 280/806 |

(Continued)

FOREIGN PATENT DOCUMENTS

DE    102020133158 A1 *  6/2022  .............. A41D 1/002

OTHER PUBLICATIONS

DE-102020133158-A1 Machine English Translation (Year: 2022).*

*Primary Examiner* — Jason D Shanske
*Assistant Examiner* — Matthew James O'Neill
(74) *Attorney, Agent, or Firm* — TROUTMAN PEPPER LOCKE LLP; James E. Schutz; Korbin M. Blunck

(57) ABSTRACT

The disclosed technology includes self-inflating animal harness systems. The self-inflating harness system can include a harness configured to be secured to an animal, an airbag attached to the harness and configured to inflate to protect the animal, and a controller in communication with the airbag. The controller can be configured to receive data from one or more sensors and determine, based on the received data, whether the data is indicative of a collision. In response to determining that the data is indicative of a collision, the controller can be configured to output a control signal to the airbag to cause the airbag to inflate.

20 Claims, 2 Drawing Sheets

(51) Int. Cl.
*B60R 21/0132* (2006.01)
*B60R 21/0136* (2006.01)
*B60R 21/015* (2006.01)
*B60R 21/18* (2006.01)
*G08B 25/00* (2006.01)
*B60R 21/01* (2006.01)

(56) References Cited

U.S. PATENT DOCUMENTS

| | | | |
|---|---|---|---|
| 2013/0147242 A1* | 6/2013 | Santana-Gallego | ................... B64D 11/06205 297/216.12 |
| 2013/0179042 A1* | 7/2013 | Katz | ................... B60R 21/0132 701/1 |
| 2015/0264548 A1* | 9/2015 | Lee | ................... H04W 4/90 370/335 |
| 2017/0006834 A1* | 1/2017 | Waters | ................... A01K 27/002 |

* cited by examiner

SELF-INFLATING ANIMAL HARNESS SYSTEM

REFERENCE TO RELATED APPLICATIONS

This application claims the benefit of priority under 35 U.S.C. § 119 to prior filed U.S. Provisional Patent Application No. 63/330,013 filed on Apr. 12, 2022, the entire contents of which is hereby incorporated by reference as if set forth in full herein.

FIELD OF TECHNOLOGY

The disclosed technology relates generally to animal harness systems and, more particularly, to harness systems used to protect animals in a vehicle.

BACKGROUND

Pet owners commonly bring their pets, such as cats and dogs, along with them when traveling in a vehicle. Some pet owners allow the pet to roam freely throughout the vehicle while other pet owners place the pet in a kennel in the vehicle. Unfortunately, pets that roam freely in a vehicle or that are placed in a kennel are not protected by restraint devices and it is common for pets to be severely injured or even killed in a vehicle collision. Furthermore, pets that are unrestrained can become a hazard to other occupants in the vehicle during a collision because the pet can become a projectile. To help prevent injuries to the pet and to occupants of the vehicle, some pet owners place their pets in a harness and secure the harness to the vehicle by, for example, using harnesses that can attach to the seat belt system in a vehicle. Pets, however, often become agitated when tightly restrained and can begin barking, biting, scratching, or exhibiting other distracting and destructive behavior. This distracting and destructive behavior can increase the chance of an accident and can also result in the pet causing damage to the vehicle.

What is needed, therefore, is a system capable of protecting an animal during a collision that does not require the animal to be tightly restrained in the vehicle. These and other problems are addressed by the technology disclosed herein.

SUMMARY

The disclosed technology relates generally to animal harness systems and, more particularly, to harness systems used to protect animals in a vehicle. The disclosed technology can include a self-inflating harness system that can be configured to inflate during a vehicle collision. For example, the self-inflating harness system can include a harness having airbags attached to it. The self-inflating harness system can include a controller that can cause the airbags to deploy when the controller determines that a collision event has begun. The controller, for example, can receive data from various sensors (e.g., an accelerometer, a gyrometer, a pressure sensor, etc.) integrated with the harness, the vehicle, or a user device such as a cellphone, and determine, based on the data whether a collision has begun. In response to determining that a collision has begun, the controller can output a control signal to cause the airbags to deploy, thereby providing protection to an animal.

The self-inflating harness system can include a harness configured to be secured to an animal, an airbag attached to the harness and configured to inflate to protect the animal, and a controller in communication with the airbag. The controller can be configured to receive data from one or more sensors and determine, based on the received data, whether the data is indicative of a collision. In response to determining that the data is indicative of a collision, the controller can be configured to output a control signal to the airbag to cause the airbag to inflate.

The one or more sensors can comprise an accelerometer configured to detect an acceleration and output acceleration data. The controller can be configured to determine, based on the acceleration data, whether a detected acceleration exceeds a threshold acceleration. In response to determining that the detected acceleration exceeds the threshold acceleration, the controller can be configured to output the control signal to the airbag to cause the airbag to inflate. The accelerometer can be integrated into the self-inflating harness. The accelerometer can be remote from the self-inflating harness.

The one or more sensors can comprise a gyrometer configured to detect a change in orientation of the self-inflating harness and output gyrometer data. The controller can be configured to receive the gyrometer data and determine whether the gyrometer data is indicative of a collision. The gyrometer can be integrated into the self-inflating harness. The gyrometer can be remote from the self-inflating harness.

The one or more sensors can comprise a sensor of a vehicle collision system.

The controller can be configured to receive collision data indicative of a collision from a vehicle collision system and determine, based on the received collision data, whether the data is indicative of a collision.

The controller can be configured to receive collision data indicative of a collision from a smart device and determine, based on the received collision data, whether the data is indicative of a collision.

The one or more sensors can comprise a tension sensor attached to the harness and be configured to output tension data. The controller can be configured to determine, based on tension data received from the tension sensor, whether a tension detected by the tension sensor exceeds a threshold tension. In response to determining that the tension exceeds the threshold tension, the controller can be configured to output the control signal to the airbag to cause the airbag to inflate.

The airbag can be configured to extend outwardly from the harness and beyond a head of the animal.

The disclosed technology can include a controller comprising a processor and a memory. The memory can have instructions stored thereon that, when executed by the processor, cause the controller to receive data from a sensor and determine, based on the received data, whether the received data is indicative of a collision. In response to determining that the received data is indicative of a collision, the controller can be configured to output a control signal to cause an airbag to inflate. The airbag can be attached to a harness configured to be secured to an animal.

The sensor can comprise an accelerometer attached to the harness. The sensor can comprise a gyrometer attached to the harness. The sensor can be remote from the harness.

In response to determining that the received data is indicative of a collision, the instructions, when executed by the processor, can further cause the controller to output an emergency signal along with position data to notify emergency personnel of the collision.

As will become apparent throughout this disclosure, the disclosed technology includes various other features and configurations that can each provide protection to an animal wearing the self-inflating harness system.

BRIEF DESCRIPTION OF THE DRAWINGS

The accompanying drawings, which are incorporated in and constitute a part of this specification, illustrate various aspects of the presently disclosed subject matter and serve to explain the principles of the presently disclosed subject matter. The drawings are not intended to limit the scope of the presently disclosed subject matter in any manner.

DETAILED DESCRIPTION

Figure 1:
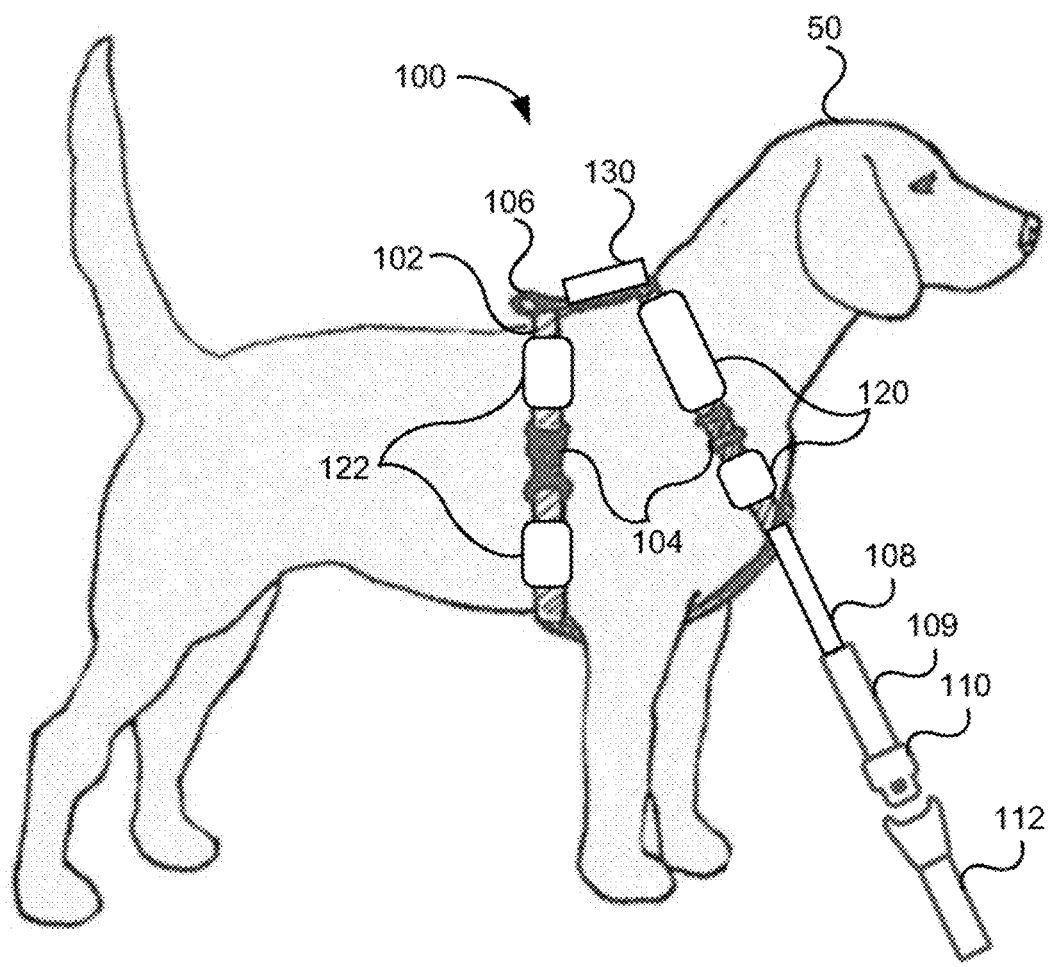
FIG. 1 illustrates a schematic diagram of an animal wearing a self-inflating harness system, in accordance with examples of the present disclosure.

Although various aspects of the disclosed technology are explained in detail herein, it is to be understood that other aspects of the disclosed technology are contemplated. Accordingly, it is not intended that the disclosed technology is limited in its scope to the details of construction and arrangement of components expressly set forth in the following description or illustrated in the drawings. The disclosed technology can be implemented and practiced or carried out in various ways. In particular, the presently disclosed subject matter is described in the context of being a self-inflating harness system to protect dogs when traveling in a vehicle. The present disclosure, however, is not so limited, and can be applicable in other contexts such as protecting animals other than dogs (e.g., cats, rabbits, rodents, ferrets, turtles, horses, sheep, cows, goats, birds, reptiles, etc.) while traveling in a vehicle or trailer. Accordingly, when the present disclosure is described in the context of a self-inflating harness for a dog, it will be understood that other implementations can take the place of those referred to.

It should also be noted that, as used in the specification and the appended claims, the singular forms "a," "an," and "the" include plural references unless the context clearly dictates otherwise. References to a composition containing "a" constituent is intended to include other constituents in addition to the one named.

Also, in describing the disclosed technology, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, the disclosed technology can include from the one particular value and/or to the other particular value. Further, ranges described as being between a first value and a second value are inclusive of the first and second values. Likewise, ranges described as being from a first value and to a second value are inclusive of the first and second values.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

The components described hereinafter as making up various elements of the disclosed technology are intended to be illustrative and not restrictive. Many suitable components that would perform the same or similar functions as the components described herein are intended to be embraced within the scope of the disclosed technology. Such other components not described herein can include, but are not limited to, similar components that are developed after development of the presently disclosed subject matter.

Referring now to the drawings, in which like numerals represent like elements, the present disclosure is herein described. FIG. 1 illustrates a schematic diagram of an animal 50 wearing a self-inflating harness system 100, in accordance with examples of the present disclosure. The animal illustrated in FIG. 1 represents a dog but, as mentioned previously, one of skill in the art will appreciate that the disclosed technology can be applicable to other animals that can be transported in vehicles. Thus, although the disclosed technology is described in relation to being adapted for use on a dog, it will be appreciated that other animals can take the place of the dog described herein.

As illustrated in FIG. 1, the self-inflating harness system 100 can include one or more straps 102 that can be placed around the animal 50. The straps 102 can be placed, for example, around the animal's chest, belly, neck, and shoulders to be securely attached to the animal 50. For example, the straps 102 can be placed around the chest, belly, neck, and shoulders of a dog similar to existing harness systems. In other examples, however, the straps 102 can be placed around the animal's hind quarters, legs, or other portions of the body. For instance, the straps 102 can be placed around the head, chest, neck, and hind quarters of a horse when traveling in a horse trailer. As will be appreciated, the placement of the straps 102 can vary depending on the animal 50 upon which the self-inflating harness system 100 is placed. For example, larger animals (e.g., horses, cows, etc.) may require straps placed in more areas around the body of the animal 50 than smaller animals (e.g., dogs, cats, rodents, etc.). Furthermore, the placement of the straps 102 can be based upon the particular bone and muscle structure of the animal 50.

The straps 102 can be made from a material or combination of materials that can sufficiently withstand the forces generated during a vehicle collision. The straps 102, for example, can be made from polyester, nylon, Kevlar®, Nomex®, Dyneema®, or other suitable materials. The straps 102 can be attached around the body of the animal 50 by one or more fasteners 104. As a non-limiting example, the fasteners 104 can include a buckle that can be easily attached or detached to facilitate placing the self-inflating harness system 100 around the animal 50. The fasteners 104 can include a strap adjuster to enable the self-inflating harness system 100 to be adjusted between a range of sizes for different sizes of animals.

The self-inflating harness system 100 can include a leash attachment 106 that can be used to attach a leash to the self-inflating harness system 100. The leash attachment 106, for example, can include an eye loop, a buckle, a hook, or other suitable attachment feature. The leash attachment feature 106 can further include a swivel or similar component to prevent a leash from becoming twisted.

The self-inflating harness system 100 can include an anchor strap 108 that can be attached to the straps 102 and a seat belt interface 110. The seat belt interface 110 can be configured to attach the self-inflating harness system 100 to a seat belt anchor 112 of a vehicle. In this way, the self-inflating harness system 100 can be used to secure the animal 50 in place in a vehicle to prevent the animal 50 from moving around the vehicle. Although shown as having a seat belt interface 110, it will be appreciated that the anchor strap can alternatively, or in addition, be configured to attach to other anchor points in the vehicle such as built-in anchors or anchored to a seat in the vehicle.

The length of the anchor strap 108 can be adjusted to permit the animal 50 a greater or lesser amount of freedom when wearing the self-inflating harness system 100. Furthermore, a stretchable portion 109 can be disposed between the anchor strap 108 and the seat belt interface 110. The stretchable portion 109 can be configured to stretch in the event of an impact to help distribute the forces during the impact and reduce the effects of the impact.

In the examples disclosed herein, the self-inflating harness system 100 can be configured to be used with the anchor strap 108 such that the animal 50 is prevented from moving freely about the vehicle, or the self-inflating harness system 100 can be configured to be used without the anchor strap 108 such that the animal 50 is permitted to move freely about the vehicle.

The self-inflating harness system 100 can include one or more airbags 120, 122 that can be configured to self-inflate upon detection of an impact, similar to an airbag in a vehicle. Although an inflated or deployed configuration is not shown, one of skill in the art will appreciate how the airbags 120, 122 can be configured to deploy in accordance with the examples described herein. The self-inflating harness system 100, for example, can include front airbags 120 and rear airbags 122 that are both attached to the straps 102. The front airbags 120 can be attached to the straps 102 proximate a front side of the animal 50 while the rear airbags 122 can be attached to the straps 102 closer to the rear of the animal 50. As non-limiting examples, the front airbags 120 can be positioned near the animal's 50 neck and head and be configured to form a cushion for the animal's 50 neck and head during a collision. For example, the front airbags 120 can be attached to the harness system 100 near the animal's 50 neck and can be configured to deploy outwardly and upwardly around the neck and head such that a portion of the front airbags 120 extends from below the neck and past the head to provide a cushion for the neck and head upon impact. The front airbags 120 can also be configured to form a brace around the animal's 50 neck to prevent injury that may occur from whiplash. For example, the front airbags 120 can be configured to deploy in a configuration such that the neck is braced in the front, rear, and sides and prevented from excessive bending or jerking during a collision. In this way, the front airbags 120 can be configured to prevent the neck and head from direct impact with objects during a collision and to prevent injury from whiplash.

The rear air bags 122, on the other hand, can be positioned near the animal's 50 chest, abdomen, hind quarters, etc. and be configured to protect the animal's chest, abdomen, hind quarters, and other parts of the animal's 50 body. For example, the rear airbags 122 can be attached to the harness system 100 rear of the animal's 50 front shoulder's such that the rear airbags 122 are nearer the chest and abdomen. The rear airbags 122 can be configured to deploy outwardly and toward the rear of the animal 50 to protect the animal's 50 chest, abdomen, hind quarters, and other parts of the animal's 50 body that are not protected by the front airbags 120. As will be appreciated, the front airbags 120 and the rear airbags 122 can be configured to deploy in predetermined directions and in predetermined shapes to best protect the animal 50 from impact in multiple directions during a collision.

Much like an airbag system commonly used in a vehicle, the airbags 120, 122 can be configured to rapidly self-inflate to form cushions for the animal 50 to minimize the impact of a collision. The airbags 120, 122, for example, can include a chemical explosive configured to form a gas to rapidly fill the airbags 120, 122. Furthermore, the airbags 120, 122 can include an airbag inflation device that can be configured to cause the airbag to inflate. Accordingly, when the airbags 120, 122 are described throughout this disclosure as being capable of self-inflation or automatic deployment, it will be appreciated that the airbags 120, 122 can include devices that are configured to cause the airbags 120, 122 to inflate.

The self-inflating harness system 100 can further include a controller 130 that can be configured to receive inputs from one or more sensors and determine whether the airbags 120, 122 should be deployed during a collision. The controller 130 can be attached to the straps 102 in a location where the controller 130 would not interfere with the airbags 120, 122. For example, the controller 130 can be attached to the straps 102 proximate the animal's 50 back.

Figure 2:
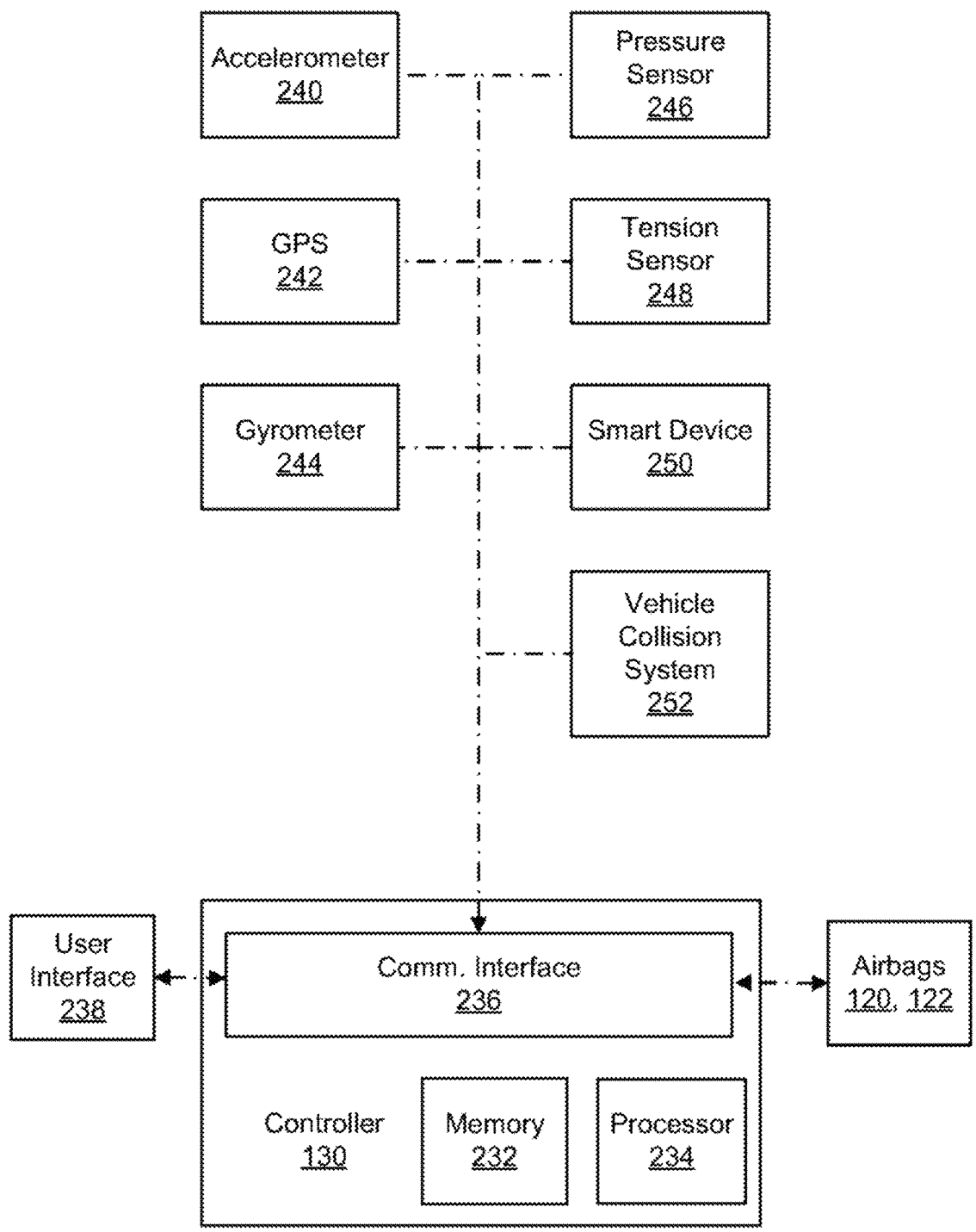
FIG. 2 illustrates a schematic diagram of a controller and various sensors of a self-inflating harness system, in accordance with examples of the present disclosure.

FIG. 2 illustrates a schematic diagram of a controller 130 and various sensors of a self-inflating harness system 100, in accordance with examples of the present disclosure. As will become apparent throughout this disclosure, the controller 130 can be configured to receive inputs from the various sensors and determine when the airbags 120, 122 should be deployed. In this way, the self-inflating harness system 100 can be configured to automatically inflate the airbags 120, 122 in the event of a collision to protect the animal 50 and other occupants of the vehicle from injury.

As illustrated in FIG. 2, the controller 130 can include a memory 232, a processor 234, and a communication interface 236. The controller 130 can be in communication with the airbags 120, 122, the user interface 238, and various sensors and/or control devices via the communication interface 236. For example, the controller 130 can be in communication with an accelerometer 240, a global positioning system (GPS) 242, a gyrometer 244, a pressure sensor 246, a tension sensor 248, a smart device 250, and/or a vehicle collision system 252. The various sensors and/or control devices just described can each individually, or in combination, output data to the controller 130. The controller 130 can then determine, based on the data received from the various sensors and/or control devices whether a collision has begun and whether the airbags 120, 122 should be deployed. As will be appreciated, the controller 130 can be configured to process the received data, determine whether to deploy the airbags 120, 122, and then output a control signal to cause the airbags to deploy in a short enough time to reduce the likelihood of an injury.

To illustrate, the controller 130 can receive data from the accelerometer 240 representative of a sudden acceleration that could be indicative of a collision. The controller 130 can then determine whether the accelerometer 240 data is indicative of a collision by determining whether the acceleration data exceeds a threshold acceleration. In response to determining that the acceleration data is indicative of a collision, the controller 130 can output a control signal to the airbags 120, 122 to cause the airbags 120, 122 to deploy. On the other hand, if the acceleration data does not exceed the threshold acceleration, the controller 130 will not output a control signal to cause the airbags 120, 122 to deploy.

The accelerometer 240 can be integrated into the self-inflating harness system 100 (e.g., integrated with the controller 130, attached to the straps 102, etc.), or the accelerometer 240 can be remote from the self-inflating harness system 100. For example, the accelerometer 240 can be part of the vehicle collision system 252 and/or part of a smart device 250. If the accelerometer 240 is part of the vehicle collision system 252, the communication interface 236 can be in communication with the vehicle collision system 252 and receive the acceleration data from the vehicle collision system 252. Alternatively, or in addition, if the accelerometer 240 is part of a smart device 250 (e.g., a smart phone, a computer, a tablet, etc.) that the pet owner has paired with the controller 130, the controller 130 can receive the acceleration data from the smart device 250 via the communication interface 236. As a non-limiting example, the controller 130 can be in communication with the pet owner's smart phone and an accelerometer 240 on the pet owner's smart phone can output the acceleration data to the controller 130.

As another example, the controller 130 can be configured to receive position data from the GPS 242 that can be indicative of a speed and/or direction of the controller 130 (and, consequently, the animal 50). If the position data is indicative of a sudden change in speed and/or position, the controller 130 can determine whether the sudden change in speed or position is indicative of a collision and output a control signal to cause the airbags 120, 122 to deploy.

Alternatively, or in addition, the GPS 242 can be used to output location data to a dispatcher, a police department, a fire department, medical personnel, etc. if a collision is detected using any of the sensors and/or control devices described herein. For example, the controller 130 can be in communication with the GPS 242 and either the controller 130 or a remote monitoring system can output an emergency signal along with position data in the event of a collision. The emergency signal can be sent to a dispatcher, a police department, a fire department, medical personnel, etc. so that assistance can be send to the site of collision.

Similar to the accelerometer 240, the GPS 242 can be integrated with the self-inflating harness system 100 (e.g., a GPS communication system can be integrated with the controller 130 and configured to communicate with the satellites and/or radio towers of a positioning system) or the GPS 242 can be integrated with the smart device 250 and/or the vehicle collision system 252.

The controller 130 can be further configured to receive data from a gyrometer 244 and determine, based on the gyrometer data, whether the data is indicative of a collision. For example, if the gyrometer data is indicative of a sudden change of orientation (e.g., rolling over in a roll over crash), the controller 130 can output a control signal to cause the airbags 120, 122 to deploy. Similar to the accelerometer 240, the gyrometer 244 can be integrated with the self-inflating harness system 100 (e.g., a gyrometer 244 can be integrated with the controller 130) or the gyrometer 244 can be integrated with the smart device 250 and/or the vehicle collision system 252.

The controller 130 can be configured to receive data from a pressure sensor 246 and determine, based on the pressure sensor data, whether the data is indicative of a collision. For example, if the pressure sensor data is indicative of a sudden spike or change in pressure (i.e., as would result from an impact to the vehicle), the controller 130 can output a control signal to cause the airbags 120, 122 to deploy. Similar to the accelerometer 240, the pressure sensor 246 can be integrated with the self-inflating harness system 100 (e.g., a pressure sensor 246 can be integrated with the controller 130) or the pressure sensor 246 can be integrated with the smart device 250 and/or the vehicle collision system 252 (e.g., side-impact pressure sensors installed on a door of the vehicle).

The controller 130 can be further configured to receive tension data from a tension sensor 248 and determine, based on the tension data, whether the data is indicative of a collision. For example, a tension sensor 248 can be integrated into the anchor strap 108 and can detect when a tension is applied to the anchor strap 108 (e.g., during a collision). The controller 130 can determine, based on the tension data, whether the tension data exceeds a threshold tension that could be indicative of a collision and output a control signal to cause the airbags 120, 122 to inflate. As will be appreciated, the threshold tension can be set sufficiently high to prevent the airbags 120, 122 from deploying from a simple pull on the anchor strap 108 as would be common with an animal 50 secured by the anchor strap 108.

The controller 130 can receive data from the smart device 250 and/or the vehicle collision system 252 and determine, based on the received data, whether the airbags 120, 122 should be deployed. For example, each of the sensors previously described can be integrated with the smart device 250 and/or the vehicle collision system 252. In this way, self-inflating harness system 100 would not require the additional sensors.

Furthermore, the smart device 250 and/or the vehicle collision system 252 can be configured to determine whether the data is indicative of a collision (rather than the controller 130 performing this function) and output a signal to the controller 130 to indicate the detection of a collision. For instance, the controller 130 can be in communication with the vehicle collision system 252 and be configured to output a control signal to cause the airbags 120, 122 to deploy if the controller receives a signal from the vehicle collision system 252 indicative of a collision. Similarly, the controller 130 can be in communication with the smart device 250 and be configured to output a control signal to cause the airbags 120, 122 to deploy if the controller receives a signal from the smart device 250 indicative of a collision. For example, an application can be installed on the smart device 250 that can cause the smart device 250 to determine, based on data received from the various sensors on the smart device the beginning of a collision and output a signal indicative of a collision to the controller 130.

The user interface 238 can be integrated with the controller 130 (i.e., a touch screen on an enclosure in which the controller 130 is installed) or the user interface 238 can be a remote device such as a smart phone, tablet, computer, vehicle computer system, etc. The user interface 238 can be used to change a setting of the self-inflating harness system 100. For example, a pet owner can input a weight of the animal 50, a height, width, length of the animal 50 or other data into the user interface 238 that the controller 130 can use to adjust various settings (e.g., threshold settings) of the controller 130. As another example, a pet owner can turn on or off the airbags 120, 122 via the user interface 238. As yet another example, a pet owner can turn on or off various settings of the self-inflating harness system 100 (e.g., turn on or off the setting that will automatically output an emergency signal to emergency personnel if a collision is detected, turn on or off position tracking, etc.)

The controller 130 can be configured to send and receive wireless or wired signals and the signals can be analog or digital signals via the communication interface 236. The wireless signals can include, for example, Bluetooth™, BLE, WiFi™, ZigBee™, infrared, microwave radio, or any other type of wireless communication as may be suitable for the particular application. The hard-wired signal can include any directly-wired connection between the controller 130 and the other components. As non-limiting examples, the directly-wired connection can include a connection such as an Ethernet or a serial connection and can utilize any suitable communication protocol for the application such as Modbus, fieldbus, PROFIBUS, SafetyBus p, Ethernet/IP, etc. Furthermore, the controller 130 can utilize a combination of wireless, hard-wired, and analog or digital communication signals to communicate with and control the various components.

The memory 232 (e.g., a computer-readable medium) can be configured store a program and/or instructions associated with the functions and methods described herein and can include one or more processors 234 configured to execute the program and/or instructions. The memory 232 can include one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like) for storing files including the operating system, application programs (including, for example, a web browser application, a widget or gadget engine, and or other applications, as necessary), executable instructions and data. One, some, or all of the processing techniques or methods described herein can be implemented as a combination of executable instructions and data within the memory.

The communication interface 236 can include hardware, firmware, and/or software that allows the processor(s) 234 to communicate with the other components via wired or wireless networks, whether local or wide area, private or public, as known in the art. Communication interface 236 can also provide access to a cellular network, the Internet, a local area network, or another wide-area network as suitable for the particular application.

While the present disclosure has been described in connection with a plurality of exemplary aspects, as illustrated in the various figures and discussed above, it is understood that other similar aspects can be used, or modifications and additions can be made to the described subject matter for performing the same function of the present disclosure without deviating therefrom. In this disclosure, methods and compositions were described according to aspects of the presently disclosed subject matter. But other equivalent methods or compositions to these described aspects are also contemplated by the teachings herein. Therefore, the present disclosure should not be limited to any single aspect, but rather construed in breadth and scope in accordance with the appended claims.

What is claimed is:

1. A self-inflating harness for an animal, the self-inflating harness comprising:
   a harness configured to be secured at least partially around a chest of an animal, the harness being removably attachable to a vehicle;
   an airbag attached to the harness and configured to inflate outwardly from the harness and beyond a head of the animal on two or more sides of the head to protect the animal;
   a controller in communication with the airbag, the controller configured to:
      receive data from one or more sensors;
      determine, based on the received data, whether the data is indicative of a collision of the vehicle; and
      in response to determining that the data is indicative of a collision of the vehicle, output a control signal to the airbag to cause the airbag to inflate.

2. The self-inflating harness of claim 1, wherein the one or more sensors comprises an accelerometer configured to detect an acceleration and output acceleration data.

3. The self-inflating harness of claim 2, wherein the controller is further configured to:
   determine, based on the acceleration data, whether a detected acceleration exceeds a threshold acceleration; and
   in response to determining that the detected acceleration exceeds the threshold acceleration, output the control signal to the airbag to cause the airbag to inflate.

4. The self-inflating harness of claim 3, wherein the accelerometer is integrated into the self-inflating harness.

5. The self-inflating harness of claim 3, wherein the accelerometer is remote from the self-inflating harness.

6. The self-inflating harness of claim 1, wherein the one or more sensors comprises a gyrometer configured to detect a change in orientation of the self-inflating harness and output gyrometer data.

7. The self-inflating harness of claim 6, wherein the controller is further configured to receive the gyrometer data and determine whether the gyrometer data is indicative of a collision.

8. The self-inflating harness of claim 7, wherein the gyrometer is integrated into the self-inflating harness.

9. The self-inflating harness of claim 7, wherein the gyrometer is remote from the self-inflating harness.

10. The self-inflating harness of claim 1, wherein the one or more sensors comprises a sensor of a vehicle collision system.

11. The self-inflating harness of claim 1, wherein the controller is configured to receive collision data indicative of a collision from a vehicle collision system and determine, based on the received collision data, whether the data is indicative of a collision.

12. The self-inflating harness of claim 1, wherein the controller is further configured to receive collision data indicative of a collision from a smart device and determine, based on the received collision data, whether the data is indicative of a collision.

13. The self-inflating harness of claim 1, wherein the one or more sensors comprises a tension sensor attached to the harness, the tension sensor configured to output tension data.

14. The self-inflating harness of claim 13, wherein the controller is further configured to:
   determine, based on tension data received from the tension sensor, whether a tension detected by the tension sensor exceeds a threshold tension; and
   in response to determining that the tension exceeds the threshold tension, output the control signal to the airbag to cause the airbag to inflate.

15. The self-inflating harness of claim 1, wherein the airbag is a first airbag and the self-inflating harness further comprises a second airbag configured to extend outwardly from the harness and toward a rear of the animal.

16. The self-inflating harness of claim 1, wherein the harness is configured to be worn by the animal when the harness is attached to the vehicle and when the harness is detached from the vehicle.

17. The self-inflating harness of claim 1, wherein the harness is configured for tool-less detachment from the vehicle.

18. A controller comprising:
   a processor; and
   a memory, the memory having instructions stored thereon that, when executed by the processor, cause the controller to:
   receive data from a sensor;
   determine, based on the received data, whether the received data is indicative of a collision; and
   in response to determining that the received data is indicative of a collision, output a control signal to cause an airbag to inflate, the airbag being attached to a harness configured to be secured at least partially around a chest of an animal and to be removably attachable to a vehicle, the airbag being configured to extend outwardly from the harness and beyond a head of the animal on two or more sides of the head.

19. The controller of claim 18, wherein the sensor is remote from the harness.

20. The controller of claim 18, wherein the instructions, when executed by the processor, further cause the controller to:
   in response to determining that the received data is indicative of a collision, output an emergency signal along with position data to notify emergency personnel of the collision.

* * * * *